United States Patent
Hermann

[19]

[11] Patent Number: 6,025,287
[45] Date of Patent: *Feb. 15, 2000

[54] COMPOSITE MATERIAL FOR ABSORBING AND DISSIPATING BODY FLUIDS AND MOISTURE

[75] Inventor: Paul F. Hermann, Dover, N.H.

[73] Assignee: H. H. Brown Shoe Technologies, Inc., Greenwich, Conn.

[*] Notice: This patent is subject to a terminal disclaimer.

[21] Appl. No.: 09/038,495

[22] Filed: Mar. 10, 1998

Related U.S. Application Data

[63] Continuation of application No. 08/653,077, May 21, 1996, Pat. No. 5,763,335.

[51] Int. Cl.[7] .................................. B32B 5/22; B32B 5/30
[52] U.S. Cl. ..................... 442/370; 428/71; 428/317.9; 442/373; 442/388
[58] Field of Search ................... 428/71, 317.9; 442/370, 373, 388

[56] References Cited

U.S. PATENT DOCUMENTS

| | | |
|---|---|---|
| 3,839,138 | 10/1974 | Kyle et al. . |
| 4,461,099 | 7/1984 | Bailly . |
| 4,517,308 | 5/1985 | Ehlenz et al. . |
| 4,864,740 | 9/1989 | Oakley . |
| 4,985,467 | 1/1991 | Kelly et al. . |
| 5,197,208 | 3/1993 | Lapidus . |
| 5,392,533 | 2/1995 | Gerhartl . |
| 5,763,335 | 6/1998 | Hermann ................................ 442/370 |

*Primary Examiner*—Blaine Copenheaver
*Attorney, Agent, or Firm*—Lerner, David, Littenberg, Krumholz & Mentlik, LLP

[57] ABSTRACT

Layered composite materials adapted to be formed into predetermined shaped components disposed for contact with moisture and body fluids having a cover layer for contact with the moisture and body fluids and a foam layer including one or more sorbents in a hydrophilic polyurethane foam matrix, wherein the foam layer is bonded to the cover layer so that moisture and body fluids in contact with the cover layer are transferred through the cover layer to the foam layer. The foam layer is established by combining an aqueous mixture including the sorbent in a predetermined ratio with the hydrophilic polyurethane. The foam layer may include other active ingredients such as odor absorption and bactericidal components, thermal phase change components and finely ground rubber tire materials to vary the characteristics of the composite material. Additionally, citric acid and surfactant compounds may be used to increase the concentration of the sorbent in the aqueous mixture and maintain the pumping fluidity of the aqueous mixture. Methods for making the layered composite materials are also described.

22 Claims, 5 Drawing Sheets

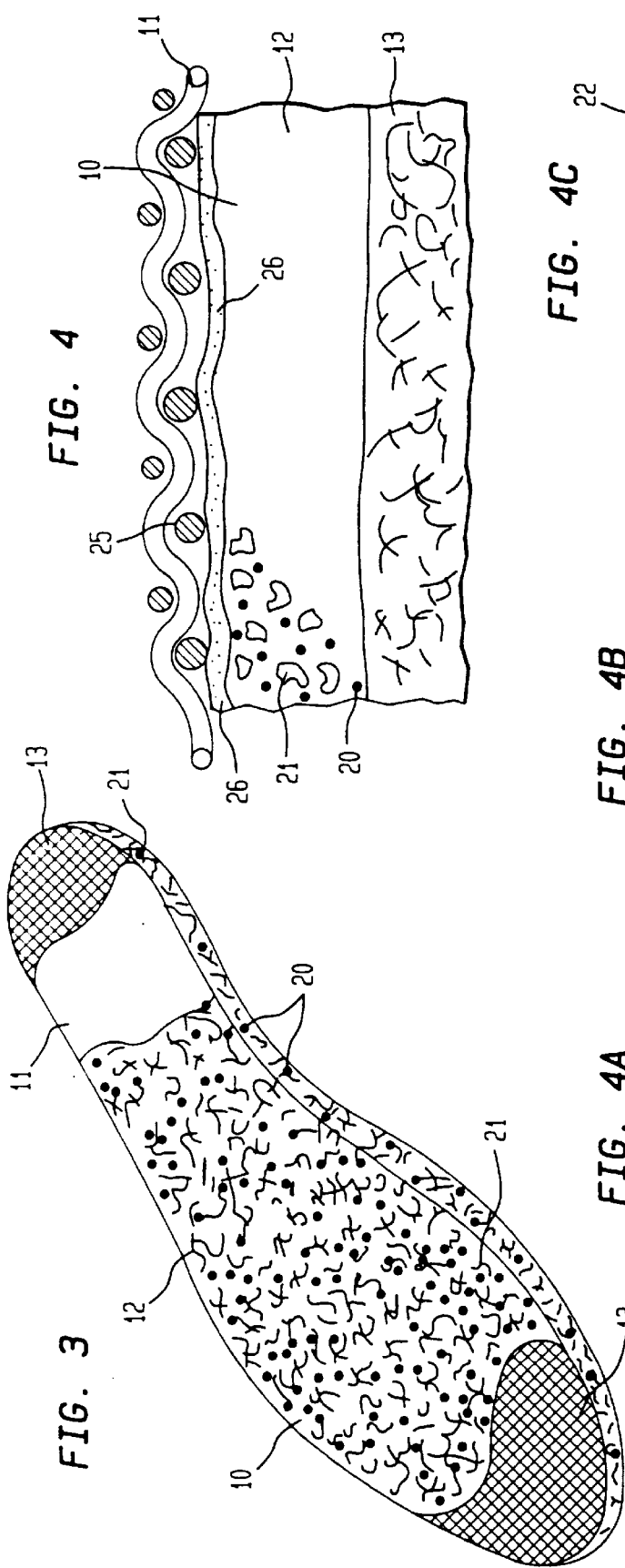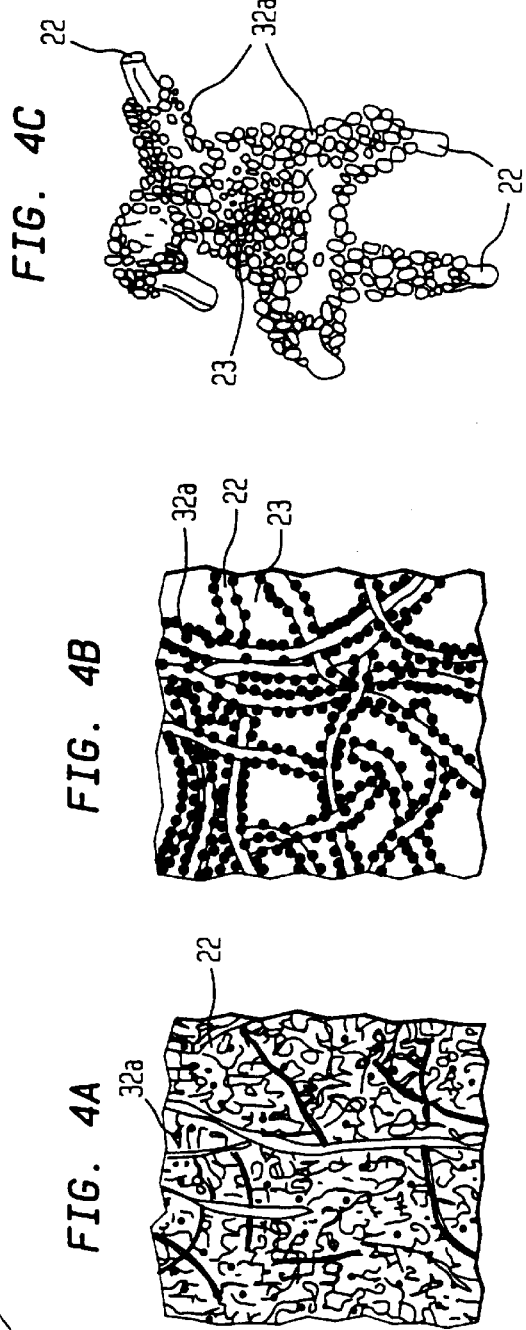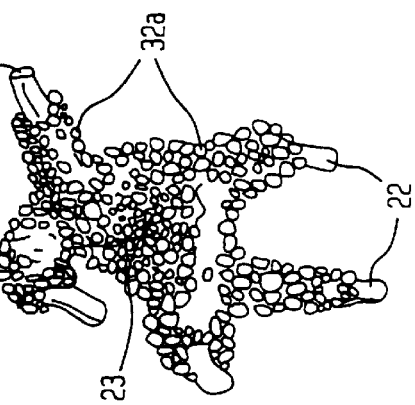

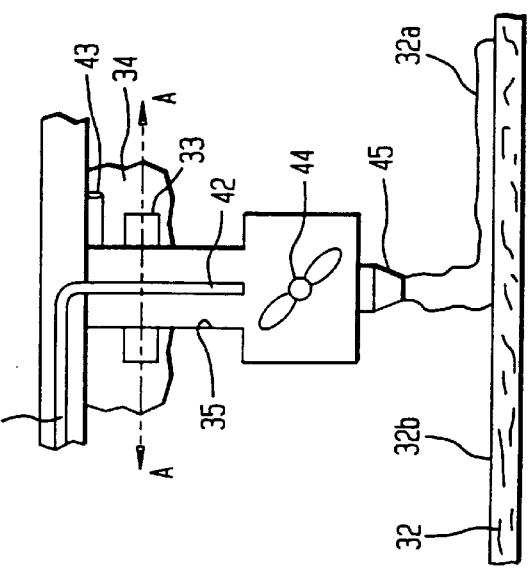
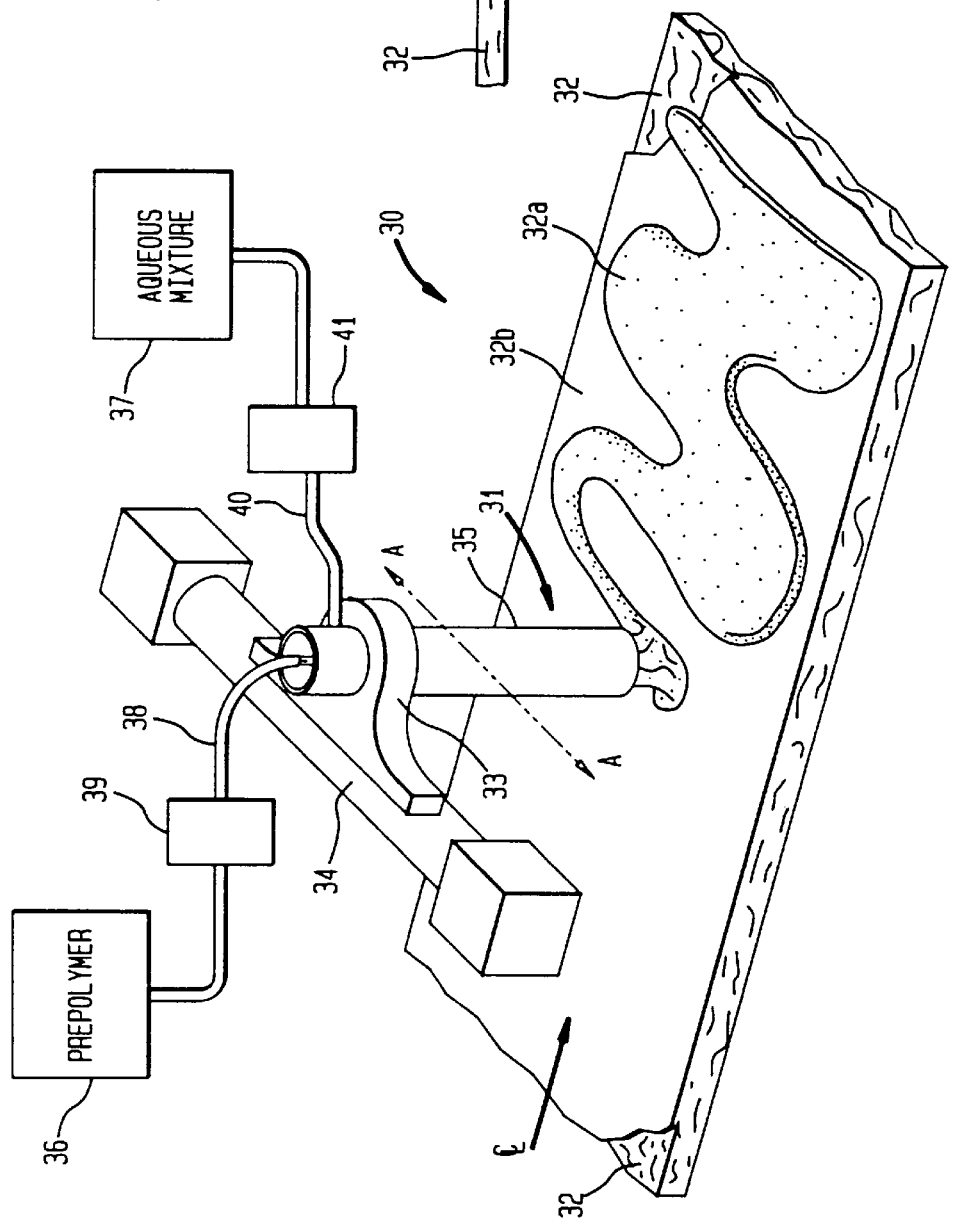

COMPOSITE MATERIAL FOR ABSORBING AND DISSIPATING BODY FLUIDS AND MOISTURE

This is a Continuation Application of prior application Ser. 08/653,077 filed May 21, 1996, now U.S. Pat. No. 5,763,335.

FIELD OF THE INVENTION

This invention relates generally to laminated materials for absorbing moisture from body activities and functions and more particularly to an improved composite material and components made from such materials, for absorbing, adsorbing, transferring, gelling or storing and dissipating body fluids and moisture, generated by the body or from body functions or other sources, and may include means for overcoming odors and the other noxious effects caused by such fluids and moisture during the generation thereof.

BACKGROUND OF THE INVENTION

Materials are known in the prior art for use as insoles in shoes, boots and apparel for absorbing perspiration and body fluids and for overcoming odors generated by such perspiration and body fluids as is shown in U.S. Pat. NoS. 5,392,533; 5,197,208; 4,864,740 and 4,517,308.

The present invention provides an improved material and method for making such material particularly adaptable for use in shoes, body pads and apparel but not limited thereto which in one preferred embodiment has a cover layer and a hydrophilic foam layer bonded thereto to facilitate absorbing, adsorbing, transferring, gelling or storing and dissipating body fluids generated by the body or body functions and other moisture. In particular, the hydrophilic foam layer is formed from a polymerized combination of an aqueous mixture, including one or more sorbents and possibly additives, with a predetermined quantity of hydrophilic urethane prepolymer, thereby enhancing the ability of the hydrophilic foam layer to draw body fluids or other moisture off and through the cover layer and absorb, adsorb, gel or store and dissipate such body fluids and moisture.

Another aspect of the present invention is to provide an improved material and method for making such material for the same objects and purposes above described in which a third or bottom layer is bonded to the side of the foam layer remote from the cover layer, such third layer being in the form of a non-woven fiber or a felted non-woven fiber material to provide stiffness or thermoformability to the composite material.

It has been found that a composite material having a foam layer formed from predetermined ratios of (1) an aqueous mixture of one or more sorbents and a thermoformable acrylic latex emulsion and (2) a hydrophilic urethane prepolymer enhances the ability of the composite material to be thermoformed into shaped components and thus maximizes the use of the composite material for products utilized in the commercial marketplace, such as insoles for footwear, incontinent pads and devices, nursing pads, protective clothing and the like type apparel and devices. The thermoformability of the composite may be further enhanced by bonding a third layer of a thermoformable non-woven fiber or a felted non-woven fiber material to the surface of the foam layer opposite the surface to which the cover layer is bonded.

The composite material so formed achieves advantageous results; for example, as an insole, it increases comfort for the user's foot:

(a) by removing perspiration generated by the foot in the shoe;

(b) by leaving the upper surface of the insole dry to the touch; and (c) by creating relatively cooler surface temperatures due to the removal of the moisture from the upper surface of the insole.

SUMMARY AND OBJECTS OF THE INVENTION

The present invention covers a composite material layered or shaped into a predetermined form for any given use having a cover layer normally disposed for contact with body fluids and other moisture, and a foam layer hydrophilic with respect to the cover layer in which one or more sorbents are included in a hydrophilic polyurethane foam matrix, wherein the foam layer is bonded to the cover layer so that moisture or body fluids in contact with the cover layer are transferred through the cover layer to the foam layer, which absorbs, adsorbs, gels and stores such body fluids and other moisture in contact with the cover layer where it is dissipated from the composite material.

The present invention also covers the composite material as above described having a third layer of non-woven fiber web or felted non-woven fiber web material bonded to the foam layer side of the foam layer remote from the cover layer to provide enhanced stiffness or thermoformability of the composite material into various three-dimensional shapes depending on the commercial function of the product.

The present invention also covers the composite material as above described including additives for at least the foam layer for overcoming odors generated by the body fluids or in the other moisture absorbed, adsorbed, gelled or stored and dissipated by the composite material.

The present invention also covers the composite material as above described including additives for at least the foam layer for providing a bactericide to kill germs generated by the body fluids or in the other moisture absorbed, adsorbed, gelled or stored and dissipated by the composite material.

The present invention also covers the various methods for making a layered formable composite material in accordance with the present invention which include the steps for forming a two layered composite material of:

a. metering and mixing an aqueous mixture, including a sorbent, surfactant and adequate water, with a predetermined ratio of hydrophilic urethane prepolymer to provide a polymerizing mixture for forming the foam layer of the composite material, b. depositing the polymerizing mixture on releasable bottom paper disposed on a moveable carrier and covering the upper surface of the polymerizing mixture with releasable top paper as the polymerizing mixture is moved with the carrier, c. advancing the polymerizing mixture in the top and bottom release paper by moving the carrier and sizing the foam layer being formed to the desired thickness until it is tack free, d. sequentially removing the top and bottom releasable paper and simultaneously drying the sized and formed foam layer to remove residual moisture, e. applying a cover layer of random oriented hydrophobic fibers to the formed and dried foam layer, and f. connecting the foam layer and cover layer and removing the formed composite material from the carrier.

The method as above described also includes various steps for connecting the cover layer of random oriented hydrophobic fibers by needle punching which operatively connects the cover layer to the foam layer to form distribution channels for transpiration of the body fluids or other moisture by the fibers into the foam layer.

As another aspect of the present invention the method may further include the steps for forming a three-layered composite material by modifying the steps as above defined after step e by:

e(1). adding non-woven fiber web or a felted non-woven fiber material selected for its stiffness or thermoformability as a bottom layer to the side of the foam layer remote from the cover layer, e(2). connecting the cover layer, foam layer and non-woven fiber web or felted non-woven fiber web material, e(3). thermoforming the cover layer, foam layer and non-woven fiber web layer to form the composite material, and e(4). die cutting the composite material to provide sized and shaped articles.

Forming composite material in accordance with the methods above described also contemplates other methods of connecting the respective layers of the composite material to each other as by adhesive bonding, radio frequency bonding, flame bonding or other methods of heat and pressure bonding, as well as by polymerizing the polyurethane foam layer directly onto the cover layer, the third layer, or both.

Accordingly, it is an object of the present invention to provide a composite layered material adapted to be formed into sized and shaped components which removes, absorbs, adsorbs, gels or stores, and dissipates body fluids and moisture.

It is another object of the present invention to provide a composite layered material adapted to be formed into insoles, incontinent pads, garments and the like which acts to draw off body fluids and other moisture, absorbs, adsorbs, gels or stores and dissipates the same so that the various insoles and incontinent pads can be cleaned and reused.

It is another object of the present invention to provide a composite layered material adapted to be formed into commercial products for drawing off body fluids and other moisture, absorbing, adsorbing, gelling or storing and dissipating the same which has a cover layer and a foam layer hydrophilic with respect to the cover layer.

It is another object of the present invention to provide a composite layered material adapted to be formed into commercial products for drawing off body fluids and other moisture, absorbing, adsorbing, gelling or storing and dissipating the same which has a cover layer, a foam layer hydrophilic with respect to the cover layer and a third layer of non-woven fiber web or felted non-woven fiber web material which enhances the stiffness or thermoformability of the composite layered material.

It is another object of the present invention to provide a composite layered material adapted to be formed into commercial products for drawing off body fluids and other moisture, absorbing, gelling or storing and dissipating the same which has at least a cover layer and a foam layer hydrophilic with respect to the cover layer and which may include additives for overcoming and reducing odors and germs.

It is a still further object of the present invention to provide a method for forming a composite layered material adapted to be formed into commercial products having at least a cover layer and a foam layer hydrophilic with respect to the cover layer and bonded to the cover layer, which method includes relatively simple steps to accomplish the formation of such layered composite material.

It is a still further object of the present invention to provide a method for forming a composite layered material adapted to be formed into commercial products having a cover layer, a foam layer hydrophilic with respect to the cover layer and a third non-woven fiber web or felted non-woven fiber web layer, all operatively connected, which method includes relatively simple steps to accomplish the formation of a layered composite material with enhanced thermoformability.

These and other objects and advantages will become apparent: from the description which follows below of preferred embodiments of the composite materials or the layered or shaped forms thereof in accordance with the present invention and the methods of making such materials when taken with the figures of the drawings in which:

BRIEF DESCRIPTION OF THE DRAWINGS

FIG. 3 shows a perspective view partly broken away showing a two-layered composite material in accordance with the present invention, in the form of an insole, FIG. 4 is an enlarged diagrammatic sketch showing in cross-section the cover layer, the foam layer and the third layer of non-woven fiber web of thermoformable material of the composite material shown in FIG. 1, connected by an adhesive bonding material, FIG. 4A is an enlarged fragmentary view showing a highly compressed fragment of the bottom or second layer of material shown in FIG. 3 in which all the interstices within the non-woven material are filled with the hydrophilic foam;

FIG. 4B is an enlarged fragmentary view showing the fibers when not under high compression in the three-layered composite material shown, in which the interstices of the non-woven material are not filled, in accordance with one embodiment of the present invention, FIG. 4C is an enlarged view of the foam-encased fibers, shown in FIG. 4B, FIG. 5 is a diagrammatic sketch of the section of a conveyor apparatus for metering and mixing in a predetermined ratio a given aqueous mixture having a sorbent and an acrylic latex emulsion with a hydrophilic urethane prepolymer and for dispensing the combined mixture on a movable carrier means for forming the foam layer of the composite material, FIG. 5A is an enlarged view of the metering, mixing and dispensing chamber shown in the apparatus in FIG. 5.

DESCRIPTION OF A FIRST EMBODIMENT

Figure 2:
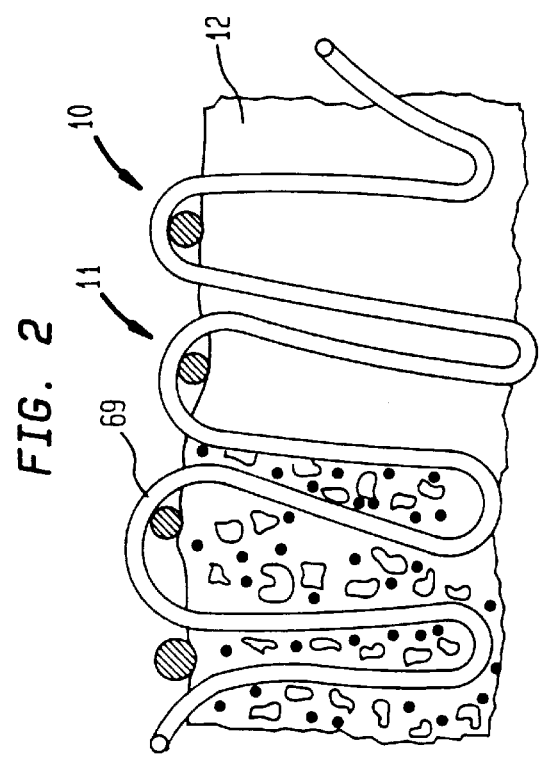
FIG. 2 is an enlarged diagrammatic sketch showing in cross-section the elements of the base layer, connected to the cover layer of the composite material, shown in FIG. 1, by needle punching.

Thus referring to the drawings, FIGS. 1, 2, 2A and 2B show a two-layered form of the composite material generally designated 10 in the form of an insole for a shoe having a cover layer 11 and a foam layer 12 that is hydrophilic with respect to the cover layer 11, which is operatively joined or connected or bonded or otherwise laminated in any suitable way to the cover layer 11 as by needle punching, so that the composite material acts to draw or transfer moisture or bodily fluids from and through the cover layer 11 into the foam layer 12 which acts as a reservoir, to absorb, gel or store and dissipate such moisture or bodily fluid as by evaporation from or by washing of the composite material. After the moisture or bodily fluid is dissipated, from time to time, the composite material can be reused. However, those skilled in the art will recognize that the composite materials formed in accordance with the present invention can also be made of materials so that the composite material can also be disposable rather than reusable.

The foam layer 12 may be first formed by polymerizing an aqueous mixture, having as its principal component one or more sorbents with or without various additives, with a predetermined quantity of a hydrophilic urethane prepolymer binder so that the polymerization of the polyurethane foam forms a matrix binder for the one or more sorbents. While the sorbents have been referred to as the principal component, it will be readily understood by those skilled in the art that the aqueous mixture may consist of various combinations of other components without departing from the scope of the present invention including absorptive fillers, fibrous materials, including non-woven fiber materials, surfactants, thermoformable acrylic latex emulsions, odor absorbents and bactericides. Further and additional components may include citric acid, rubber particles and thermal phase change particles depending on certain advantageous and desirable characteristics or functions to be achieved by the composite material.

The characteristics of the sorbent component may be selected so that the volume, rate of absorption and the retention or gelling of the moisture absorbed under varying ambient conditions of temperature and pressure may be optimized for a given composite material being formed. Preferred sorbents adapted for use in the aqueous mixture are primarily super absorbent polymers available in the commercial marketplace as SAB 800 from STOCKHAUSEN, Greensboro, N.C. 27406; as SANWET IM 1000 from Hoechst Celanese Corporation, Portsmouth Va. 23703; as ARIDAL 1460 form Chendal Corporation, Palatine, Ill. 60067; and as ARASORB 800F from Arakawa Chemical Industries, Limited, Osaka 541, Japan.

These sodium polyacrylate/polyalcohol polymer and co-polymer sorbents are manufactured and sold in free-flowing, discrete solid particles, in powder or granular form, and are characterized by the fact that they have a propensity for absorbing increasing quantities of aqueous fluid. This would normally lead to the complete solution of the polymers into the aqueous mixture. However, due to the chemical characteristics of the polymers and copolymers, the formation of a gel takes place precluding the solution of the polymer or co-polymers. Other sorbents including polyethylene oxide, sodium carboxymethyl cellulose, and like polymers, desiccants such as silica gel, clays such as bentonite, and the like may be used as well.

Figure 2B:
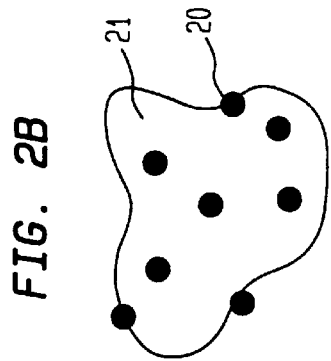
FIG. 2B is an enlarged fragmentary cross-section taken on line 2B—2B of FIG. 2A.
Figure 2A:
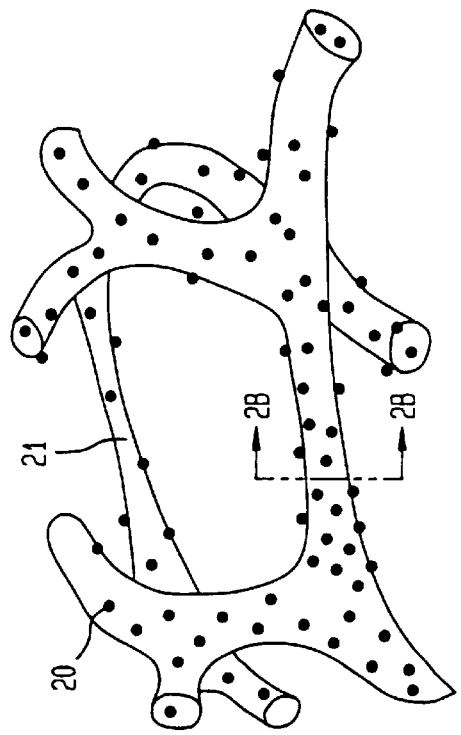
FIG. 2A is an enlarged fragmentary view showing a section of the foam layer of the composite material shown in FIG. 1.

Thus, when an aqueous mixture is metered and mixed with a hydrophilic urethane prepolymer, as more fully described below, the urethane prepolymer reacts with the water in the aqueous mixture to form a hydrophilic polyurethane foam, and at the same time, as shown in FIGS. 2A and 2B, when a sodium polyacrylate sorbent 20 is present, reacts with the sorbent to form a hydrophilic acrylic urethane interpolymer 21.

The combination of the sorbent with the hydrophilic foam thus formed acts in composite materials of either two larger or multiple layers to absorb, adsorb and gel the moisture drawn through the cover layer and to contain and store it so as not to rewet the cover top layer of the layered composite material. The sorbents thus add hydrophilicity to the foam layer of the composite materials.

The additives which may be combined in the aqueous mixture with the sorbents are also available in the commercial marketplace.

Thermoformable acrylic latex emulsions are available from Union Carbide Corporation of New York, N.Y., Rohm & Haas, B.F. Goodrich and others. One preferred form of acrylic emulsion is available from Union Carbide under the trademark "UCAR 154". As is well known to those or ordinary skill in the art, latex emulsions are surfactant-stabilized polymer emulsions, and are commonly used as binders for non-woven materials. The thermoformable latexes form thermoplastic polymer films that are capable of being formed or molded when the film is heated above the glass transition temperature of the polymer.

Use of acrylic latex emulsions in the foam layer of the present invention thus serves as an alternative to the three-layer composite materials of the present invention wherein the third layer is a thermoformable non-woven material bonded to the side of the foam layer remote from the cover layer. The thermoformable acrylic latex emulsions; are incorporated into the foam layer by including the emulsion as part of the aqueous mixture reacted with the hydrophilic urethane prepolymer. The water content of the emulsion reacts with the hydrophilic urethane prepolymer to form the polyurethane foam when the aqueous mixture and the urethane prepolymer are reacted together. Thus, the water content of the emulsion should be included as part of the water content of the aqueous mixture when calculating the ratio of the aqueous mixture to be reacted with the urethane prepolymer. Those of ordinary skill in the art will understand that the acrylate component contributed by the thermoformable acrylic latex emulsion is discrete and separate from the acrylate component contributed by the sodium polyacrylic sorbent, when present.

When the foam polymerization is complete, residual water is driven off by drying the foam at a temperature of about 200° F. After bonding of the foam layer to cover layer, the thermoformable acrylic latex, when present, permits the forming or molding of the composite by heating the composite in a mold or other form at a temperature above the glass transition temperature of the acrylic latex, typically a temperature of about 270° F., after which the composite is cooled and removed from the mold or form.

Surfactants useful in the combinations in accordance with the present invention are prepared from nonionic polyethylene and polypropylene oxides such as the BASF surfactant available under the trademark "PLURONIC".

Odor absorption materials are also well known to those skilled in the art and include, activated carbon, green tea, "ABSENT" (UOP); zinc oxide and the like materials.

Bactericides are provided in the commercial marketplace by a myriad of suppliers for controlling bacterial and germ growth. One preferred material is supplied by Lauricidin Co. of Galena, Ill. 61036, under the trademark "LAURICIDIN".

Phase change materials are capable of absorbing approximately 100 BTU/lb. These materials are described in prior art U.S. Pat. Nos. 4,756,958 and 5,254,380.

Other components may be added to the aqueous mixtures, such as citric acid as a buffer for reducing the pH of the water component to increase loading of the sorbent and the fluid characteristic of the aqueous mixture to facilitate pumping of the aqueous mixture; and ground rubber particles from tires available from Composite Particles of Allentown, Pa. increase the resiliency and thermal protection of the composite material. These will be illustrated in the examples of the aqueous mixture more fully set forth below.

The hydrophilic urethane prepolymer component is also available in the commercial marketplace. Suitable prepolymers will be readily recognized by those of ordinary skill in the art and are described in prior art U.S. Pat. Nos. 4,137,200; 4,209,605; 3,805,532; 2,993,013 and general procedures for the preparation and formation of such prepolymers can be found in Polyurethane's, Chemistry and Technology by J. H. Saunders and K. C. Frisch published by John Wiley & Sons, New York, N.Y., at Vol. XVI Part 2, High Polymer Series, "Foam Systems", pages 7–26, and "Procedures for the Preparation of Polymers", pages 26 et seq.

One preferred form of such prepolymer adapted for use in the present invention because of its strong hydrophilic characteristics and its reasonable price is marketed by Matrix R & D of Dover, N.H. as TDI/PEG Urethane Prepolymer under the trademark "BIPOL". These products are polyether urethane polymers of toluene diisocyanate terminated polyethylene glycol with less than six percent (6%) available unreacted NCO groups and a component functionality of two (2) or less.

Another urethane prepolymer is available from W.R. Grace Company of New York, N.Y. sold under the trademark "HYPOL 3000". This "HYPOL" urethane prepolymer is a polyisocyanate capped polyoxylene polyol prepolymer having a component functionality greater than two (2). However, this prepolymer is formulated with a triol which reduces its hydrophilic capability. Therefor this "HYPOL" urethane prepolymer is less acceptable for the formation of the base layer of the composite material.

Figure 1:
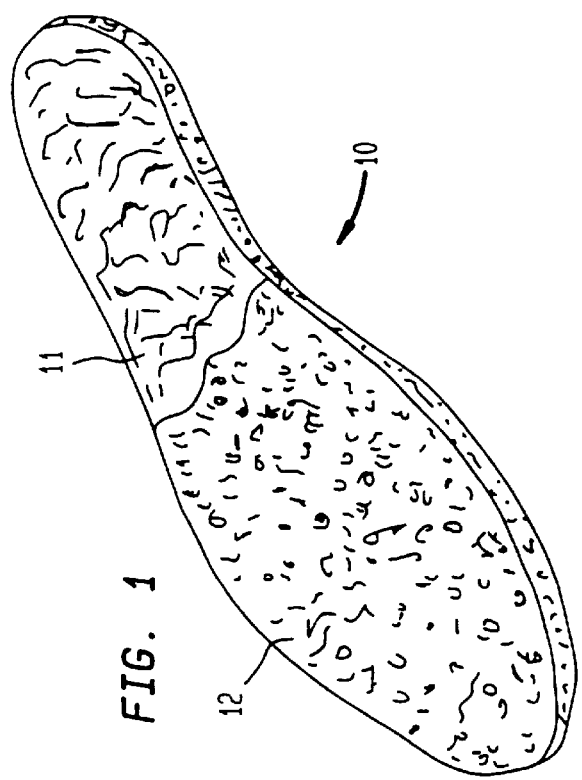
FIG. 1 shows a perspective view partly broken away showing a two-layered composite material in accordance with the present invention, in the form of an insole.

When the hydrophilic urethane prepolymer is added in precise amounts to the aqueous mixture, in addition to controlling the absorption characteristics of the final composite material, it has been found that it enhances the composite material so it can be sized and thermoformed into three-dimensional shapes such as the insole for shoes as shown in FIG. 1 of the drawings.

Thus, in the formation of the foam layer, a given aqueous mixture will be blended in ratios of 2 to 10 parts by weight of the aqueous mixture to 1 part by weight of the hydrophilic urethane prepolymer. Controlling in precise amounts the relative ratio of the aqueous mixture to the hydrophilic acrylic urethane prepolymer within these limits does not impair the capabilities of the super-absorbent polymer for absorbing and gelling moisture and body fluids with which the composite material comes into contact.

Another form of the composite material 10 in accordance with the present invention is shown in FIGS. 3 and 4 in which the cover layer 11, foam layer 12 hydrophilic with respect to the cover layer 11 and a bottom or third layer 13 in the form of a non-woven fiber web or felted non-woven fiber web material. In this form of the composite material, depicted in FIGS. 3, 4, 4A, 4B and 4C, the non-woven fibers selected are preferably those having stiffening or thermoforming capabilities.

Non-woven webs of fibrous materials for this purpose are available in the commercial marketplace as polyester non-woven fibers coated with acrylic resin from Union Wadding of Pawtucket, R.I.; Carr Lee of Rockleigh, N.J.; Stearns Kem Wove of Charlotte, N.C.; and Loren Products of Lawrence, Mass. Such polyester non-woven webs of fibrous material are used in the present invention because of their durability, adhesion to the components of the respective aqueous mixtures, because they act to reduce shrinkage during the secondary drying steps in the formation of the foam layer 12 for the composite material being formed as is hereinafter described and because of the increase tensile strength they impart to thin films of the composite material, in accordance with the present invention, as those used in apparel and other products. Union Wadding supplies such preferred non-woven fibrous webs at 1½ to 3 ounces per yard (¼" to ½" thickness). These are polyester 3 and 6 denier fiber acrylic spray bonded thermoformable materials. These products are formulated to enhance thermoformability of the multi-layered composite material.

Similarly felted non-woven webs of fibrous material are also available in the commercial marketplace from Non Wovens Inc. of North Chelmsford, Mass., who supply their products 8 oz. per square yard, 0.080 thickness, 65% low melt polyester and 35% high melt polyester. These felted non-woven webs of fiber material provide the same improved characteristics to the foam layer 12 of the composite material 10 in accordance with the present invention as has been above described.

It should be noted that non-woven materials may also be introduced as a component of the polyurethane foam layer, rather than being bonded to the foam layer as a discrete third layer. The addition of the non-woven material within the foam layer adds strength, minimizes shrinkage in drying and acts as a wick for moisture transpiration into the foam layer. Such foam layers are formed by depositing the polymerizing foam onto a non-woven fiber web and compressing the foam-coated web to 10% of its thickness, thus coating the fibers of the web with the polymerized foam containing interstitial voids.

The Method of Making the Composite Material

The formation of these alternate types of composite material in accordance with the present invention is done on generally state of the art equipment, and this is illustrated by the diagrammatic sketches shown in FIGS. 5, 5A, 6 and 7 of the drawings.

Thus, in the diagrammatic sketches at FIGS. 5 and 5A, the first section of the equipment or apparatus generally designated 30, is shown as having a metering, mixing and dispensing unit generally designated 31, disposed to move transversely, as shown by the directional arrow A—A, to the longitudinal line of movement of an endless conveying belt or carrier 32, for depositing blended and mixed combinations of the aqueous mixtures and hydrophilic urethane prepolymer as at 32a on a releasable paper 32b positioned on the conveying belt 32 where further polymerization will then occur.

Metering, mixing and dispensing unit 31 is shown as including, housing 33 which is mounted for movement to and fro along carrying beam 34 and defines a blending and mixing chamber 35. A first mixing vessel 36 is provided for the hydrophilic urethane prepolymer. A second mixing vessel 37 is provided for forming and holding any one of the combinations of the aqueous mixtures, examples of which are hereinafter described.

First mixing vessel 36 is so connected by a first pipe line 38 to the housing 33 that it communicates with the blending and mixing chamber 35 defined by the housing 33. A first pump 39 in first pipe line 38 acts to pump metered quantities of a fluid mixture of the hydrophilic urethane prepolymer from the first mixing vessel 36 to the blending and mixing chamber 35 in the housing 33. Similarly, the second mixing vessel 37 is so connected by a second pipeline 40 to the housing 33 that a second pump 41 in the second line 40 can pump metered quantities of the given combination of the aqueous mixture to the blending and mixing chamber 35 in the housing 33.

First pump 39 and second pump 41 are metering pumps so that the respective volumes by weight of the given aqueous mixture and hydrophilic urethane prepolymer in the desired ratios will be delivered to the blending and mixing chamber 35.

The delivery section 42 of the first pipeline 38 is disposed to deliver the hydrophilic urethane polymer into the central portion of the blending and mixing chamber 35 while the delivery section 43 for the second pipeline 40 is connected so that the given combination of the aqueous mixture is delivered tangentially about the centrally disposed delivery section 42 of the first pipeline 38, to enable the respective components of the foam hydrophilic layer 12 of the composite material being formed, to be intimately mixed by any suitable mixing device or rotor as at 44 in the blending and mixing chamber 35 formed by the housing 33, all of which is shown by FIGS. 5 and 5A of the drawings.

FIG. 5A further shows that the housing 33 has a dispensing head or nozzle 45 on the end of the housing 33 adjacent to the upper surface of the conveyor belt or carrier 32 and so communicates with the blending and mixing chamber 35 that during operation of the apparatus the nozzle 45 will deliver the blended and mixed combination of the given aqueous mixture and hydrophilic urethane prepolymer generally designated 32a onto the moving upper surface of the bottom release paper 32b positioned on the conveyor belt 32 on carrier 32, all of which is shown by FIGS. 5, 5A, 6 and 7 of the drawings.

Figure 6:
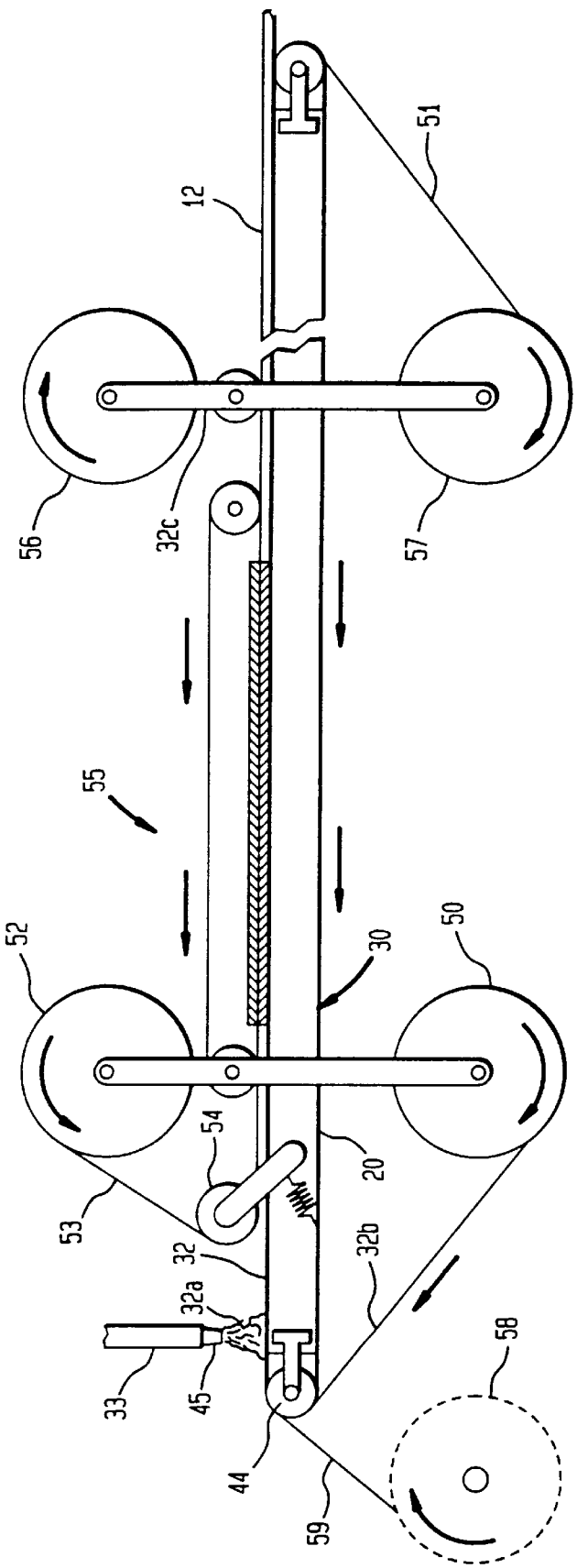
FIG. 6 is a further diagrammatic sketch of a another section of the apparatus for forming the foam layer for the composite material.

FIG. 6 shows another section of the conveying belt system 30 having, a roll 50 of silicone or the like type of bottom release paper 32b which is first delivered from the roll 50 to a position on the upper surface of the conveyor belt 32 at the point where the dispensing head or nozzle 45 delivers the given combined mixture 32a as above described. This, polymerizing combined mixture 32a thus is cast in a sinusoidal path because of the transverse movement of the mixing, blending and dispensing head 33, onto the bottom release paper 32b. Mixture 32a, and the bottom release paper 32b will move and advance with the conveyor belt 32 to a point where a roll 52 of similar silicone or top release paper 32c covers the combined polymerizing mixture 32a as it passes under a preliminary adjustable sizing roller 54 to bring the combined polymerizing mixture 32a to an initial thickness.

On further advancing movement of conveyor belt 32 the combined polymerizing mixture 32a disposed between the bottom release paper 32b and top release paper 32c is now moved into a compression mechanism generally designated 55 where further sizing of the combined polymerizing mixture 32a to the desired thickness is established depending on the ultimate use of the composite material to be formed into components to be stamped or to be cut from the composite material.

When the combined polymerizing mixture 32a emerges from the compression mechanism 55, it will be for all purposes self-sustaining and the top release paper 32c is stripped off by first stripping roller 56, while the generally now self-sustaining foam layer 36a on the bottom release paper 32b continues with the advancing movement of the conveyor belt 32 until the end of the conveyor belt 32 is reached, at which time the bottom release paper 32b is then also stripped off by second stripping roller 57, all of which is shown by FIG. 6 of the drawings.

Thus, as shown in FIGS. 5, 5A and 6 and as above described, the polymerizing combined mixture 32a is discharged from the dispensing nozzle 45 directly onto the upper surface of the bottom release paper 32b to provide the sheet stock form of the foam layer 12 for the composite material 10.

Apparatus of this type, as well as the controls for establishing the operation of the conveyor belt and the delivery of the combined mixture by the dispensing head or nozzle, is generally well known to those skilled in the art and therefor has not been more fully described.

After the blended combination of the aqueous mixture and the hydrophilic urethane prepolymer 46 is deposited as above described on the conveyor belt 32 as the belt moves along, this polymerizing mixture is then further treated to provide one layer 12 of the composite material in accordance with the present invention.

The respective combinations of the given aqueous mixture and predetermined quantity of hydrophilic urethane prepolymer may take a variety of forms and will be transported by the conveyor belt 32 until the polymerizing given combined mixture has been shaped, sized and become the self-sustaining foam layer 12 and is ready to be united or connected to the cover layer 11 to form the composite material 10.

Figure 7:
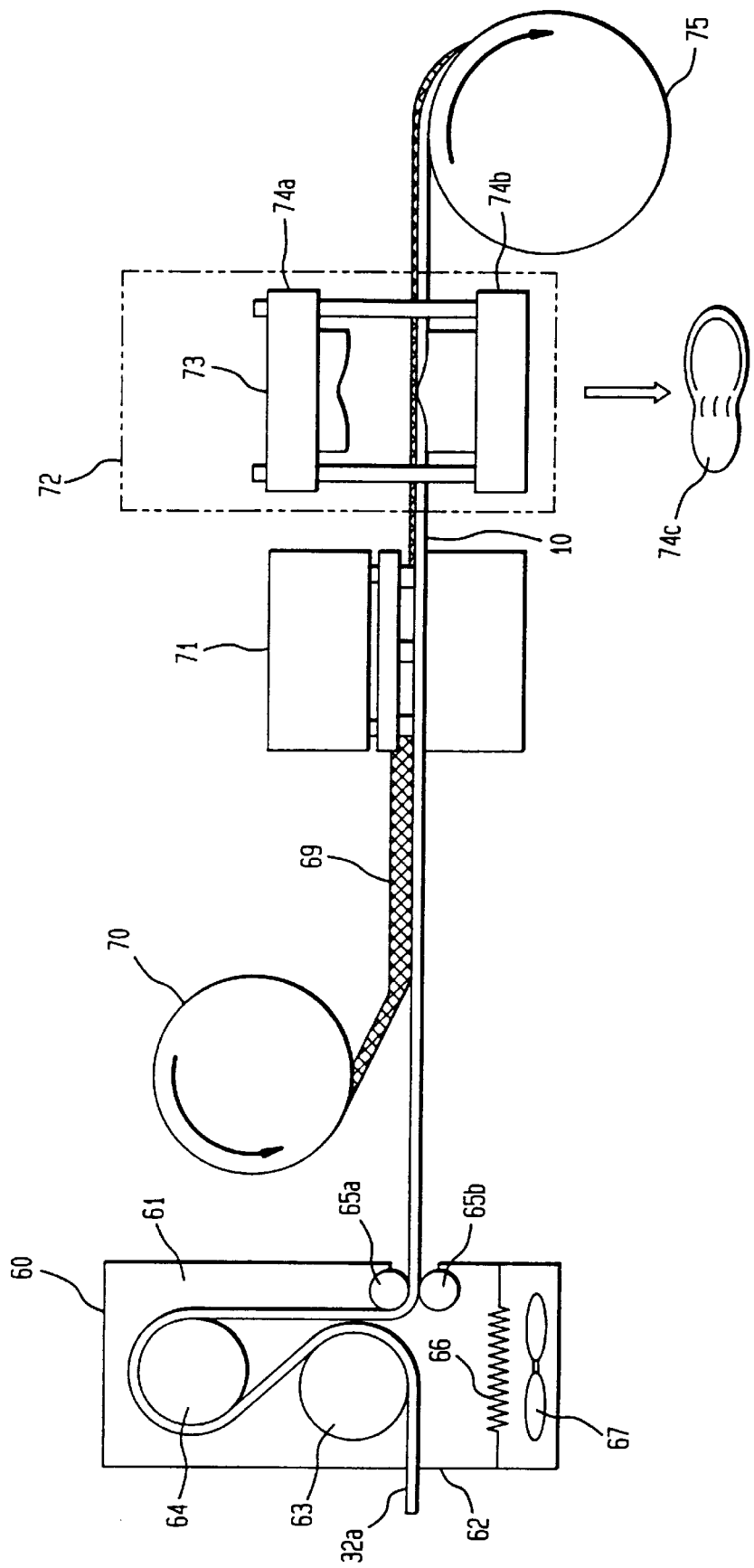
FIG. 7 is a further diagrammatic sketch of another section of the apparatus showing how the composite material is formed and includes a step for needle punching, thermoforming and for cutting insoles for shoes out of the formed composite material.

In order to complete the formation of the two-layered composite material, FIG. 7 shows in a further section of the apparatus that the generally self-sustaining combined mixture forming the foam layer 36a is now passed into and through any suitable form of drying unit generally designated 60 to remove substantially all of the remaining moisture to then provide the foam layer 12 for joinder and connection with the cover layer 11 to form the composite material 10.

Drying units such as the drying unit 60 shown in FIG. 7 are well known devices and include generally a drying space 61 into which the self-sustaining combined mixture forming the hydrophilic foam layer 36a is introduced through entrance opening 62 where it passes over idling rollers as at 63, 64 and coacting driving rollers as at 65a and 65b so that heated air at a temperature below 260°F. from the heating means 66 can be blown by fan means 67 through the drying space 61 to pass over the moving generally self-sustaining hydrophilic foam layer 36a to substantially remove all the remaining moisture from the hydrophilic foam layer 12. Foam layer 12 is then advanced by the driving rollers 65a and 65b through an exit outlet 68 to the secondary or finishing steps for the formation of the two-layered composite material 10.

As shown in FIG. 7, as the hydrophilic foam layer 12 is now further advanced, randomly oriented three denier acrylic fibers 69, approximately three (3) inches long, are dispensed from a roll 70 and laid onto the upper surface of the moving hydrophilic foam layer 12 at about three (3) ounces of fiber per square foot to position a cover layer 11 on the upper surface of hydrophilic foam layer 12. The composite material can now be formed by joining this cover layer 11 to the hydrophilic foam layer 12 by any suitable means such as passing the cover layer 11 and hydrophilic foam layer 12 through a needle punching station generally designated 71 where they are mechanically joined.

Needle punching machines are well known in the art. In the diagrammatically illustrated needle punching station 71, the cover layer 11 and hydrophilic foam layer 12 are advanced through the machine at about ten (10) lineal feet per minute during which the needles, not shown, are operated at about 600 strokes per minute to provide 850 punctures per square inch through the cover layer 11 and hydrophilic foam layer 12 to mechanically attach the randomly oriented polyester fiber cover layer 11 to the hydrophilic foam layer 12 to form the two-layered composite material 10.

In the cross-sectional view of the composite material shown at FIG. 2, the result of connecting the cover layer 11 to the foam layer 12 by needle punching shows how the randomly oriented polyester fibers 69 have been forcibly impaled in the needle punching machine 71 so that they penetrate through the surface of the cover layer 11 into and through the hydrophilic foam layer 12 to force some of the fibers to extend out of the bottom surface of the foam layer 12. When needle punching is used to connect the cover layer 11 to the foam layer 12 to establish the composite material 10, the layer of randomly oriented polyester fibers forming the cover layer 11 are reduced to a generally non-measurable thickness, impart a fabric feel to the top or upper surface of the formed composite material and these polyester fibers act as a wick to distribute and transfer moisture or bodily fluids from the cover layer 11 to the hydrophilic foam layer 12 to achieve the advantages of the present invention. Additionally, the polyester fibers provide a top or cover layer 11 for the formed composite material 10 which will withstand abrasion. Furthermore, the needle punching provides channels through the cover layer 11 and foam layer 12 through, which moisture or body thereby may travel, thereby enhancing the distribution and transfer of these liquids from the cover layer 11 to the foam layer 12. For this reason, needle punching is a preferred means of bonding the cover layer 11 to the foam layer 12.

Three-layered forms of composite material, in accordance with the present invention, can be achieved when stronger self-sustaining forms of the composite material are required or when more accurate forms of the composite material are needed for thermoforming of three-dimensional shapes. This may be obtained by discharging the polymerizing combined mixture 32a directly onto some form of non-woven or felted non-woven fibers, as is shown at FIG. 6 of the drawings. Thus, by reference to FIG. 6, a roll 58, shown in phantomized form, carries a web of non-woven fibers or felted non-woven fibers 59 for providing this form of the base or for foam layer 12. These non-woven fibers or felted non-woven fibers are so delivered and introduced onto the advancing conveyor belt 32 that the non-woven fibers or felted non-woven fibers 59 will be positioned between the upper surface of the bottom release paper 32b and the polymerizing combined mixture 32a being discharged from the dispensing nozzle 45.

Those skilled in the art will readily understand that the polymerizing combined mixture 32a, when cast onto non-woven or felted non-woven fiber webs, now goes through the same sizing steps and the peeling off of the top and bottom release papers as was first described for the formation of the stock sheets of the hydrophilic foam layer 12.

The amount or degree of sizing and compression which the polymerizing combined mixture 32a undergoes establishes the voids or interstitial spaces between the fibers in the non-woven fiber or felted non-woven fiber materials used. In general, as shown in FIGS. 4A, 4B and 4C, the lesser the degree of compression, the greater will be the volume of the polymerized combined mixture 32a in the voids 23 or interstitial spaces between the fibers 22 of the particular non-woven fiber web or felted non-woven fiber web materials used. Conversely, the greater the degree of compression, the less the volume of polymerized combined material 32a so that the fibers 22 of the non-woven fiber web or felted non-woven fiber web material used will then only be coated on their outer surfaces and the greater will be the extent of the voids or interstitial spaces between the fibers, as shown by the enlarged fragmentary FIGS. 4A, 4B and 4C of the drawings.

While the needle punching bonding technique is illustrated and above described, those skilled in the art will recognize that there are other ways for connecting the cover layer 11 to the hydrophilic foam layer 12 to form the composite material 10. Thus, it is possible to substitute, in place of a randomly oriented polyester fiber 68, material known as "sock liner" which can be positioned progressively, by adhesive bonding, to the moving upper surface of the foam layer 12 to form the composite material 10. A urethane adhesive for this purpose is manufactured and sole by Mace Adhesives of Dudley, Mass. and is readily available in the commercial marketplace. This and other adhesives that are used for this purpose must not block the transfer of moisture or body fluids from the cover layer 11 to the foam layer 12 of the formed composite material 10. FIG. 4 shows a cross-section of composite material using a woven "sock liner" material 25 and a urethane adhesive 26.

Another method of connecting the cover layer 11 to the foam layer 12 to form the composite material 10 is by advancing the foam layer 12 with the layer of "sock liner" on the upper surface of the foam layer 12 into a radio frequency heat energy devices. In such radio frequency heat energy device the cover layer 11 will be bonded to the foam layer 12 to form the composite material in accordance with the present invention. Other methods of connecting the cover layer 11 to the foam layer 12 to form the composite material 10 is by conventional flame bonding techniques, or by directly polymerizing the foam layer 12 onto the cover layer 11, again by conventional means.

It has been found that bonding of the cover layer 11 and the foam layer 12 to form the composite material 10 can be used in conjunction with the molding or cutting of the composite material into three-dimensional shapes to provide products such as insoles, and incontinent pads.

This is shown in FIG. 7 of the drawings in which a radio frequency heat energy device is shown by the phantomed lines at 72 and the molding press generally designated 73 with top molding die 74a and bottom molding die 74b. The top molding die 74a and bottom molding die 74b are shaped and configured as coacting male and female units for cutting the three-dimensional product from the formed composite material. When the dies are open as shown in FIG. 7 and the composite material 10 is advanced into position on the female die, the male die is moved to the closed position to form and cut the three-dimensional product such as the insole illustrated at FIGS. 1 and 3 from the advancing composite material 10 so that it will drop out of the molding press 73. The scrim or remaining portion of the advancing composite material 10 can be conveniently collected on a take-up roller 75.

The radio frequency heat energy devices and the molding press are well known devices and accordingly are not more fully described. Those skilled in the art will also recognize that the molding device 72 can be used with composite material 10 formed at the needle punching station 71 in order to provide the three-dimensional products such as insoles and incontinent pads. Similarly, the needle punching station 71 may be taken out of operation to permit the cover layer 11 and base layer 12 to be adhesively bond or to be bonded by radio frequency heat energy device 72.

When a thermoformable acrylic latex emulsion is added to the given aqueous mixture and then mixed and blended in a predetermined ratio with the hydrophilic urethane prepolymer, the composite material 10 formed from the hydrophilic foam layer 12 will mold well into three-dimensional products to produce fine details, decorative impressions and logos. Further, the dielectric properties of the respective cover layer 11 and foam layer 12 lends itself to the formation of the composite material by short cycle time for radio frequency heat energy bonding which acts to raise the temperature of the cover layer 11 and foam layer 12 above the thermoplastic temperature of 270° F. for setting and bonding the layers to form the composite material 10.

EXAMPLES OF AQUEOUS MIXTURES AND THE PREDETERMINED RATIOS WITH HYDROPHILIC URETHANE PREPOLYMERS

In the examples which follow, the ingredients were introduced and mixed well between the additions of the respective ingredients to establish the wide variety of aqueous mixture for mixture with the hydrophilic urethane prepolymer first to establish the hydrophilic foam layer 12. Then by combining the hydrophilic foam layer 12 with the cover layer 11, the composite material 10 in accordance with the present invention is formed, all of which has been above described.

Example 1

One form of aqueous mixture included the following ingredients:

| Ingredients | Percent by Weight |
| --- | --- |
| Water | 62.58 |
| Surfactant (BASF F88 PLURONIC) | 6.95 |
| Citric Acid | .51 |
| Acrylic Emulsion (UCAR 154) | 26.06 |
| Super-absorbent polymer (Stockhausen SAP 800HS) | 3.90 |

This aqueous mixture was then metered and mixed with a hydrophilic urethane prepolymer such as "BIPOL" in a ratio of 2.95 to 1.00 by weight to provide a combination which polymerizes as it moves on the conveyer belt 33 into the sizing and compressing steps as above described before it is combined with the cover layer to form the composite material in accordance with the present invention.

The inclusion of the citric acid served to lower the pH of the water permitted the concentration of the super-absorbent polymer to be increased without interfering with the pumping characteristics of the aqueous mixture or the combination for forming the hydrophilic foam layer 12 of the composite material 10 formed.

Example 2

Another form of the aqueous mixture included the ingredients as follows:

| Ingredients | Percent by Weight |
| --- | --- |
| Water | 79.53 |
| Surfactant (BASF F88 PLURONIC) | .81 |
| Citric Acid | .62 |
| Super-absorbent polymer (Stockhausen SAP 800HS) | 1.53 |
| Bactericide | .83 |

This aqueous mixture was metered and mixed with hydrophilic urethane prepolymer "BIPOL" in a ratio of 5.20 to 1.00 by weight onto a layer of non-woven fiber web material on the conveyer belt where the combination of the polymerizing mixture and the layer of non-woven fiber web material were sized and compressed to 25% of the thickness which provided a hydrophilic foam layer having voids between the fiber filler.

The non-woven fibers from Union Wadding and Carr Lee were selected because they contained a semi-cured acrylic binder which facilitated in the formation of the composite material and the thermoforming of products from such composite material.

Example 3

The combination of the aqueous mixture and the hydrophilic urethane prepolymer of Example 2 was also deposited on a layer of felted non-woven fiber web on the conveyer belt 33. Then the combination of layers of material were sized and compressed to 10% of the thickness. This provided a hydrophilic foam layer 12 wherein the fibers were coated with interstitial voids. The composite material formed from this type of hydrophilic foam layer 12 was found to thermoform well into products such as insoles, incontinent pads in accordance with the present invention.

Example 4

This aqueous mixture was formed with thermoformable acrylic latex emulsion additives because it was found that the glass transition temperature and pH of the acrylic latex emulsion aided in providing an improved aqueous mixture. The ingredients for this form of the aqueous mixture were as follows:

| Ingredients | Percent by Weoght |
| --- | --- |
| Water | 46.35 |
| Surfactant (BASF F88 Pluronic) | 5.15 |
| Citric Acid | .38 |
| Acrylic Emulsion (UCAR 154) | 19.30 |
| Super-absorbent Polymer (Stockhausen SAP 800HS) | 2.89 |

This aqueous mixture was combined with hydrophilic urethane prepolymer "BIPOL" in a ratio of 3.00 to 1.00 by weight. This mixture was deposited on a ½" of non-woven fiber web material moving at a rate of 9 feet per minute on the conveyer belt 33 and produced a composite material which thermoformed well in accordance with the present invention.

Example 5

This aqueous mixture produced a composite material with improved thermal properties. The ingredients were as follows:

| Ingredients | Percent by Weight |
| --- | --- |
| Water | 70.1 |
| Surfactant (BASF F88 PLURONIC) | .8 |
| Citric Acid | .6 |
| Super-absorbent Polymer (Stockhausen SAP 800 HS) | 1.5 |
| Thermal Phase Change Material (Thermosorb 65, PCM) | 9.5 |
| Bactericide | .8 |

This aqueous mixture was combined with hydrophilic urethane prepolymer in a ratio of 5.20 to 1.00.

When the composite material was formed, it was found that the products had more thermal protection and took two percent (2%) of the time for cold to penetrate the composite material formed.

Example 6

The versatility of the present invention to vary the composite material without impairing the characteristics of the hydrophilic foam layer of the composite material is illustrated by the present example in which the composite material is made more flexible by the addition of reclaimed rubber tire particles. Thus the ingredients for this aqueous mixture are as follows:

| Ingredients | Percentage by Weight |
| --- | --- |
| Water | 31.03 |
| Surfactant (BASF F88 PLURONIC) | 1.60 |
| Citric Acid | .77 |
| Super-absorbent Polymer (Stockhausen SAP 800HS) | 1.92 |
| Bactericide | .80 |
| Rubber Particles (VISITRON 4010) | 6.75 |
| NMP Solvent | 2.00 |

This aqueous mixture was combined with the hydrophilic urethane prepolymer (BIPOL) in a ratio of 1 to 1 and was cast on a non-woven fiber web material. It was found to double the density of the composite material formed to approximately 13 lbs./cu. ft., increased the resiliency of the products formed from the composite material, yet maintained and did not impair the absorption characteristics of the hydrophilic foam layer of the composite material.

Example 7

This example of the aqueous mixture provides a composite material having odor absorption characteristics. It includes the following ingredients:

| Ingredients | Percentage by Weight |
| --- | --- |
| Water | 57.7 |
| Surfactant (BASF F88 Pluronic) | 2.0 |
| Citric Acid | 1.3 |
| Super-absorbent polymer (Stockhausen SAP 800HS) | 3.2 |
| Bactericide | 1.0 |
| Green Tea (Ikeda, Japan) | 14.8 |

The aqueous mixture was combined with the hydrophilic urethane prepolymer "BIPOL" in a range of 4.00 to 1.00, and was deposited on a non-woven fiber web to form the hydrophilic foam layer for the composite material.

Products formed from the composite material were tested and found to absorb cigarette smoke very well.

Thus, there have been described various embodiments for composite materials and illustrations of components formed therefrom for various uses and purposes; however, variations and substantial equivalents thereof can be readily developed by those skilled in the art and these are deemed to be included within the scope of the appended claims.

What is claimed is:

1. A layered composite material adapted to be formed into predetermined shaped components disposed for contact with moisture and body fluids comprising:
    a cover layer for contact with said moisture and body fluids;
    a foam layer hydrophilic with respect to said cover layer comprising one or more moisture absorbing sorbents in a hydrophilic polyurethane foam matrix, wherein said foam layer is bonded to said cover layer so that moisture or body fluids in contact with said cover layer are transferred through said cover layer to said foam layer.

2. The layered composite material of claim 1, wherein said cover layer comprises a randomly oriented polyester fiber material.

3. The layered composite material of claim 1, wherein said cover layer comprises sock liner material.

4. The layered composite material of claim 1, wherein said foam layer further includes a thermoformable acrylic latex.

5. A molded article thermoformed from the layered composite material of claim 4.

6. The molded article of claim 5, thermoformed using radio frequency heat energy.

7. The layered composite material of claim 1, wherein said foam layer further includes one or more additives selected from a group consisting of absorptive fillers, fibrous materials, surfactants, odor absorbents, bactericides, pH buffers, rubber particles and thermal phase change particles.

8. The layered composite material of claim 7, wherein said odor absorption materials are selected from a group consisting of activated carbon, green tea and zinc oxide.

9. The layered composite material of claim 1, wherein said one or more moisture absorbing sorbents are selected from the group consisting of absorbent polymers, clays and desiccants.

10. The layered composite material of claim 9, wherein said one or more moisture absorbing sorbents include an absorbent polymer selected from the group consisting of sodium polyacrylates, sodium polyalcohols, polyethylene oxides and sodium carboxymethyl celluloses.

11. The layered composite material of claim 1, further including a third layer of non-woven material bonded to the side of said foam layer remote from said cover layer.

12. The layered composite material of claim 11, wherein said third layer comprises a non-woven fiber web or felted non-woven fiber web material.

13. The layered composite material of claim 12, wherein said non-woven material is a thermoformable polyester non-woven material having fibers coated with acrylic resin.

14. A molded article thermoformed from the layered composite material of claim 13.

15. The molded article of claim 14, thermoformed using radiofrequency heat energy.

16. The layered composite material of claim 11, wherein said foam layer is directly polymerized on said cover layer or on said third layer, or on both of said cover layer and said third layer.

17. The layered composite material of claim 1, wherein said foam layer is bonded to said cover layer by needle punching.

18. The layered composite material of claim 1, wherein said foam layer is bonded to said cover layer with an adhesive capable of transferring said moisture and body fluids from said cover layer to said foam layer.

19. The layered composite material of claim 1, wherein said foam layer is bonded to said cover layer by thermoplastic heat bonding.

20. The layered composite material of claim 19, wherein said thermoplastic heat bonding is radio frequency heat energy bonding.

21. The layered composite material of claim 1, wherein said foam layer is bonded to said cover layer by flame bonding.

22. The layered composite material of claim 1, wherein said foam layer is directly polymerized onto said cover layer.

* * * * *